(12) United States Patent
Karppi et al.

(10) Patent No.: US 9,809,930 B2
(45) Date of Patent: Nov. 7, 2017

(54) PAPERMAKING AGENT SYSTEM, METHOD FOR MAKING A PAPERMAKING AGENT SYSTEM AND ITS USE

(71) Applicant: Kemira Oyj, Helsinki (FI)

(72) Inventors: Asko Karppi, Turku (FI); Matti Hietaniemi, Espoo (FI); Marco Polverari, Leonard (CA)

(73) Assignee: Kemira OYJ, Helsinki (FI)

( * ) Notice: Subject to any disclaimer, the term of this patent is extended or adjusted under 35 U.S.C. 154(b) by 138 days.

(21) Appl. No.: 14/442,433

(22) PCT Filed: Nov. 13, 2013

(86) PCT No.: PCT/FI2013/051072
§ 371 (c)(1),
(2) Date: May 13, 2015

(87) PCT Pub. No.: WO2014/076372
PCT Pub. Date: May 22, 2014

(65) Prior Publication Data
US 2016/0273166 A1    Sep. 22, 2016

(30) Foreign Application Priority Data

Nov. 13, 2012 (FI) .................................... 20126189

(51) Int. Cl.
| | | |
|---|---|---|
| *D21H 21/10* | (2006.01) | |
| *D21H 17/37* | (2006.01) | |
| *D21H 17/41* | (2006.01) | |
| *C08L 3/08* | (2006.01) | |
| *D21H 17/29* | (2006.01) | |
| *D21H 17/00* | (2006.01) | |
| *D21H 21/06* | (2006.01) | |
| *C08B 31/12* | (2006.01) | |
| *D21H 21/20* | (2006.01) | |

(52) U.S. Cl.
CPC .......... *D21H 21/10* (2013.01); *C08B 31/125* (2013.01); *C08L 3/08* (2013.01); *D21H 17/29* (2013.01); *D21H 17/375* (2013.01); *D21H 17/72* (2013.01); *D21H 21/06* (2013.01); *D21H 21/20* (2013.01)

(58) Field of Classification Search
CPC ...... D21H 21/10; D21H 17/375; D21H 17/41; C08L 3/08
See application file for complete search history.

(56) References Cited

U.S. PATENT DOCUMENTS

| | | | | |
|---|---|---|---|---|
| 4,533,434 A | * | 8/1985 | Yoshioka | ............... D21H 17/15 156/39 |
| 4,908,100 A | * | 3/1990 | Hunter | .................... D21H 21/10 162/168.3 |
| 5,482,595 A | * | 1/1996 | Harrington, IV | ...... D21H 23/14 162/168.3 |
| 5,571,380 A | * | 11/1996 | Fallon | .................. D21H 17/375 162/168.2 |
| 5,584,966 A | * | 12/1996 | Moffett | .................. D21H 17/29 162/168.1 |
| 5,859,128 A | * | 1/1999 | Moffett | .................... C08B 31/00 525/54.2 |
| 6,033,525 A | | 3/2000 | Moffett | |
| 6,048,929 A | * | 4/2000 | Moffett | .................. C08B 31/00 525/54.2 |
| 6,059,930 A | * | 5/2000 | Wong Shing | .......... D21H 23/04 162/168.2 |
| 6,103,064 A | * | 8/2000 | Asplund | .............. D21H 17/375 162/168.3 |
| 2004/0132896 A1 | * | 7/2004 | Kubota | .................. B01D 21/01 524/558 |
| 2004/0171719 A1 | * | 9/2004 | Neivandt | .................. C08L 3/00 524/47 |
| 2006/0130991 A1 | * | 6/2006 | Solhage | ............... D21H 17/375 162/158 |
| 2007/0151688 A1 | * | 7/2007 | Solhage | ................. D21H 17/74 162/158 |

(Continued)

FOREIGN PATENT DOCUMENTS

| | | | |
|---|---|---|---|
| WO | | 9923155 A1 | 5/1999 |
| WO | | 2004076552 A1 | 9/2004 |

OTHER PUBLICATIONS

International Search Report and Written Opinion for PCT/FI2013/051072 dated Feb. 13, 2014.

(Continued)

*Primary Examiner* — Liam J Heincer
(74) *Attorney, Agent, or Firm* — Thomas | Horstemeyer, LLP

(57) ABSTRACT

The invention relates to a papermaking agent system in liquid form, which comprises (i) cationic starch solution, prepared by cooking a starch mixture comprising a starch component and a water component, and (ii) polymer composition, which has anionic and cationic groups and a cationic net charge of >0.1 meq/g. The polymer composition comprises or originates from at least one of constituents a), b) or c). Constituent a) contains an amphoteric polymer, which is a copolymer comprising structural units derived from acrylamide and/or methacrylamide monomers, and anionic and cationic groups attached to the copolymer. Constituent b) contains a first polymer, which is a copolymer comprising structural units derived from acrylamide and/or methacrylamide monomers, and anionic or cationic groups attached to the copolymer, as well as a second polymer, which comprises groups with opposite charge than the first polymer. Constituent c) contains a third polymer, which comprises a copolymer comprising structural units derived from acrylamide and/or methacrylamide monomers, as well as hydrolytically unstable cationic groups attached to the copolymer. Constituent a), b) or c) is added to one of the components of the starch mixture or to the starch mixture before the cooking of the starch mixture, and/or constituent a) or b) is added to the cationic starch solution after cooking of the starch mixture. The invention relates also to the use of the papermaking agent system and to a method for its preparation.

15 Claims, 2 Drawing Sheets

(56) References Cited

U.S. PATENT DOCUMENTS

Figure 1:
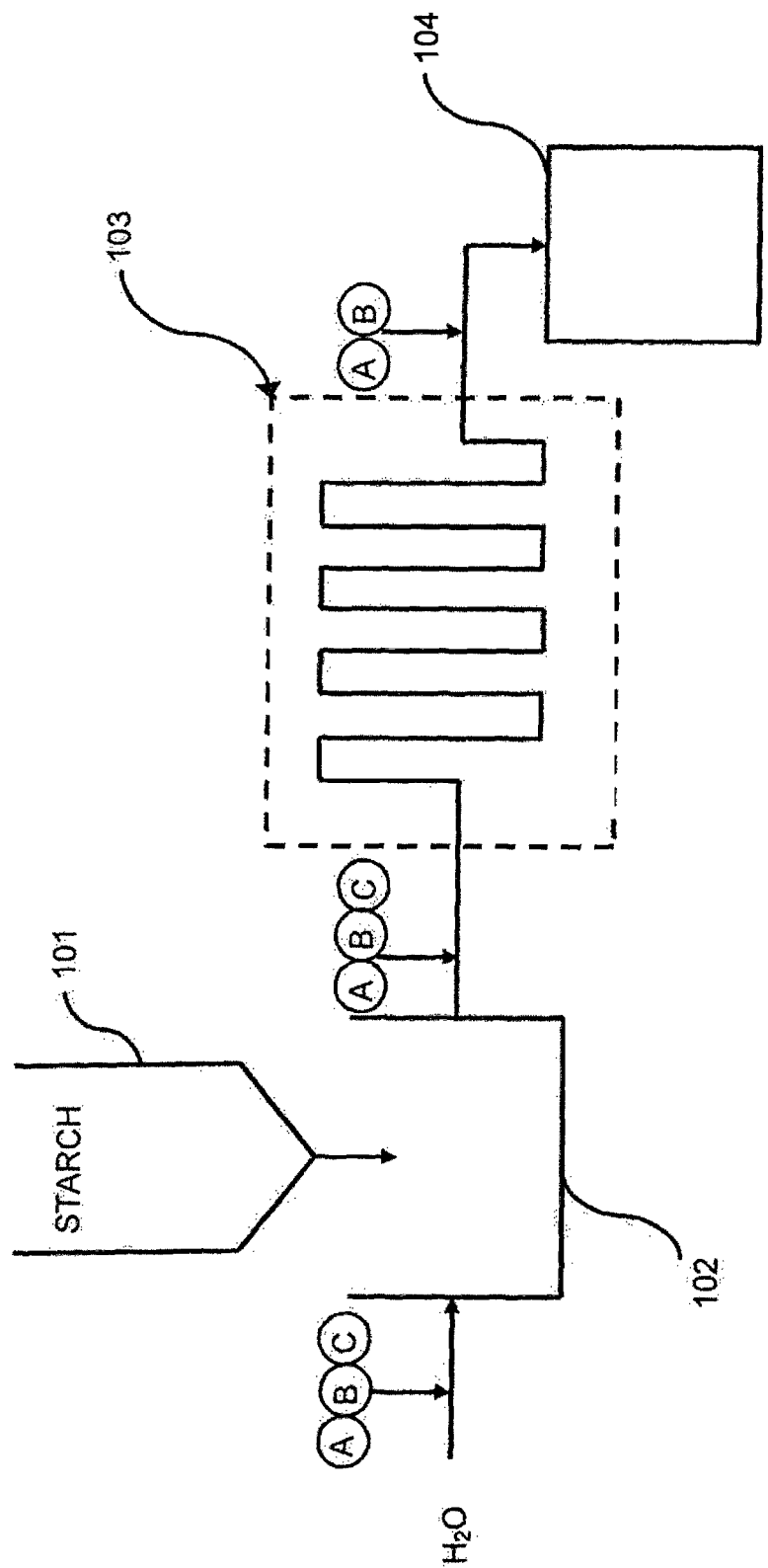

| | | | |
|---|---|---|---|
| 2008/0004405 A1* | 1/2008 | Mori | C08B 31/10 525/451 |
| 2008/0277084 A1* | 11/2008 | Denowski | D21H 17/16 162/164.6 |
| 2009/0127205 A1* | 5/2009 | Sikes | C02F 1/56 210/725 |
| 2011/0082290 A1* | 4/2011 | Gardner | A61K 8/731 536/56 |
| 2012/0118523 A1* | 5/2012 | Lu | D21H 21/18 162/164.6 |
| 2013/0186584 A1* | 7/2013 | Krapsch | D21H 17/28 162/161 |
| 2014/0053996 A1* | 2/2014 | Esser | D21H 17/37 162/164.3 |
| 2014/0124155 A1* | 5/2014 | Jehn-Rendu | D21H 17/44 162/168.3 |
| 2014/0367059 A1* | 12/2014 | Gray | D21H 17/375 162/127 |
| 2015/0041092 A1* | 2/2015 | Hietaniemi | D21H 27/002 162/168.4 |
| 2015/0068697 A1* | 3/2015 | Karppi | C08L 3/08 162/164.3 |
| 2015/0144282 A1* | 5/2015 | Lu | D21H 17/43 162/164.5 |
| 2015/0176210 A1* | 6/2015 | Jogikalmath | D21H 17/28 162/175 |
| 2015/0197890 A1* | 7/2015 | Laakso | D21H 17/74 162/164.2 |
| 2016/0176719 A1* | 6/2016 | Sanne | C01B 33/141 162/164.6 |
| 2016/0289896 A1* | 10/2016 | Hietaniemi | D21H 17/375 |

OTHER PUBLICATIONS

National Board of Patents and Registration of Finland Search Report for 20126189 dated Aug. 29, 2013.

* cited by examiner

PAPERMAKING AGENT SYSTEM, METHOD FOR MAKING A PAPERMAKING AGENT SYSTEM AND ITS USE

CROSS-REFERENCE TO RELATED APPLICATION

This application is the 35 U.S.C. §371 national stage application of PCT Application No. PCT/FI2013/051072, filed Nov. 13, 2013, which claims priority to and the benefit of, Fl Patent Application No. 20126189, filed Nov. 13, 2012, both of which are herein incorporated by reference in their entirety.

The present invention relates to a papermaking agent system, method for making a papermaking agent system and its use according to the preambles of the enclosed independent claims.

TECHNICAL FIELD

Cationic starch is commonly used in papermaking, for example as a strength additive. Cationic starch can be added to the furnish, where it interacts with the negatively charged fibre surfaces and improves the strength properties of the produced paper. Starch which is added to the furnish should interact as effectively as possible with the fibres. Starch should adhere to the fibre surfaces, otherwise it is removed from the process to the circulation water. Starch which does not adhere to the fibre surfaces may cause foaming, high biological oxygen demand (BOD) and high chemical oxygen demand (COD) levels in the circulation water, as well as poor retention and drainage. Poor starch retention to fibres may result in low strength properties of dry paper, and it may also cause linting and dusting problems for paper.

Starch comprises amylopectin and amylose, which are natural polymers build from glucose units. Amylopectin is highly branched and may comprise up to 2,000,000 glucose units, whereas amylose is fairly linear and comprises typically from 300 to 6000 glucose units. Because of its small size amylose is poorly retained to the fibres in the furnish. Consequently amylopectin rich starches are usually preferred in the papermaking. Amylopectin rich starches may be, however, more expensive. Use of starches, which have high amylose content, may also increase the consumption of starch, which naturally increases the process costs.

There is a constant desire to improve the retention of cationic starch to fibres and thus improve the strength properties of the produced paper. Similarly, there is a constant need to cut the costs, i.e. to use cheaper starch and to reduce the amount of used retention chemicals.

The object of the present invention is to minimize or even eliminate the disadvantages existing in the prior art.

One object of the present invention is to provide a papermaking agent system, with which the retention of the cationic starch as well as the strength of the final paper may be improved.

Typical papermaking agent system in liquid or solution form according to the present invention comprises (i) cationic starch solution, prepared by cooking a starch mixture comprising a starch component and a water component, and
(ii) polymer composition, which has anionic and cationic groups and which has a cationic net charge of >0.1 meq/g, preferably >0.5 meq/g, at pH 7, the polymer composition comprising, or originating from, at least one of constituents a), b) or c), where constituent a) contains an amphoteric polymer, which is a copolymer comprising structural units derived from acrylamide and/or methacrylamide monomers, and anionic and cationic groups attached to the copolymer,
constituent b) contains a first polymer, which is a copolymer comprising structural units derived from acrylamide and/or methacrylamide monomers, and anionic or cationic groups attached to the copolymer, as well as a second polymer, which comprises groups with opposite charge than the first polymer,
constituent c) contains a third polymer, which comprises a copolymer comprising structural units derived from acrylamide and/or methacrylamide monomers, as well as hydrolytically unstable cationic groups attached to the copolymer,
wherein constituent a), b) and/or c) is added to one of the components of the starch mixture or to the starch mixture before the cooking of the starch mixture, and/or
constituent a) and/or b) is added to the cationic starch solution after cooking of the starch mixture.

Typical method for making a papermaking agent system in liquid or solution form, comprises
(i) preparing a cationic starch solution by cooking a starch mixture, which comprises a starch component and a water component, and
(ii) obtaining a polymer composition, which has anionic and cationic groups and which has net charge of >0.1 meq/g, preferably >0.5 meq/g, at pH 7, the polymer composition comprising or originating from at least one of constituents a), b) or c), where constituent a) is an amphoteric polymer, which is a copolymer comprising structural units derived from acrylamide and/or methacrylamide monomers, and anionic and cationic groups attached to the copolymer,
constituent b) contains a first polymer, which is a copolymer comprising structural units derived from acrylamide and/or methacrylamide monomers, and anionic or cationic groups attached to the copolymer, as well as a second polymer, which comprises groups with opposite charge than the first polymer,
constituent c) contains a third polymer, which comprises a copolymer comprising structural units derived from acrylamide and/or methacrylamide monomers, as well as hydrolytically unstable cationic groups attached to the copolymer,
wherein constituent a), b) and/or c) is added to one of the components of the starch mixture or to the starch mixture before the cooking of the starch mixture, and/or
constituent a) and/or b) is added to the cationic starch solution after cooking of the starch mixture.

Typical use of a papermaking agent system according to the present invention is in papermaking or boardmaking for increasing the retention of starch, preferably cationic starch, to the formed web.

Now it has been surprisingly found out that both the efficiency and retention of cationic wet-end starch is clearly and unexpectedly improved when the starch is added to a fibre furnish as a part of a papermaking agent system, which comprises also a polymer composition, which has both cationic and anionic groups. The polymer composition may be formed of various constituents, which have a net charge of at least 0.1 meq/g at pH 7. The constituent may be an amphoteric copolymer, where the cationic and anionic groups are attached to the copolymer structure or backbone, or alternatively the constituent may be a mixture of cationic and anionic polymers. It is also possible that the polymer composition originates from a constituent, which comprises only cationic groups when it is united with or introduced to the starch mixture or one of its components, as long as a part of the cationic groups are hydrolysed into anionic groups during the cooking of starch mixture and preparation of the final papermaking agent system. The different constituents comprise copolymers comprising structural units derived from acrylamide and/or methacrylamide monomers. It is assumed, without wishing to be bound by a theory that the anionic groups of the amphoteric polymer composition interact with the cationic starch and form large starch/polymer-complexes, whereas the cationic groups of the amphoteric polymer composition improve the interaction of the formed starch/polymer complex with the fibres in the furnish. Thus the papermaking agent system according to the present invention improves the overall retention of the starch, especially the retention of the amylose units, to the fibres. In this manner the strength properties of the final paper are also increased, and the amount of starch in the circulation water of the paper or board production is decreased. The present invention may also enable a decrease in amount of used retention chemicals, whereby the overall cost efficiency of the papermaking process is improved.

Cationic starch solution, which is used in the present invention, is prepared by cooking a starch mixture, which comprises a starch component and a water component. Thus, cationic starch solution is a water solution of starch that has been cooked according to methods that are as such well-known for a person skilled in the art. Cooking may be performed with a jet cooker or batch wise or with any other suitable method for cooking starch. The temperature during the starch cooking is typically 95-150° C.

The starch component in the starch mixture may be any suitable cationic starch, which is used in paper making, such as potato, rice, corn, waxy corn, wheat, barley or tapioca starch, preferably corn starch, wheat starch, potato starch or tapioca starch, more preferably potato starch. Typically the amylopectin content of the starch component in the starch mixture is in the range of 65-90%, preferably 70-85% and the amylose content is in the range of 10-35%, preferably 15-30%. According to one embodiment at least 70 weight-% of the starch units of the cationic starch component in the starch mixture have an average molecular weight (MW) over 20 000 000 g/mol, preferably 50 000 000 g/mol, more preferably 100 000 000 g/mol.

Starch may be cationized by any suitable method. Preferably starch is cationized by using 2,3-epoxypropyltrimethylammonium chloride or 3-chloro-2-hydroxypropyltrimethylammonium chloride, 2,3-epoxypropyltrimethylammonium chloride being preferred. It is also possible to cationize starch by using cationic acrylamide derivatives, such as (3-acrylamidopropyl)-trimethylammonium chloride.

Typically cationic starch component comprises cationic groups, such as quaternized ammonium groups. Starch component in the starch mixture has usually a degree of substitution (DS), which indicates the number of cationic groups in the starch on average per glucose unit, in the range of 0.01-0.20, preferably 0.01-0.1, more preferably 0.015-0.06. Typically cationic starch component in the starch solution has a charge density of 0.06-1.0 meq/g, preferably 0.06-0.56 meq/g, more preferably 0.09-0.35 meq/g.

According to one preferred embodiment of the invention the cationic starch component is non-degraded, which means that the starch component has been modified solely by cationisation, and its backbone is non-degraded and non-cross-linked. Cationic non-degraded starch component is of natural origin.

According to first embodiment of the invention the polymer composition comprises a constituent a), which is an amphoteric polymer, which is a copolymer comprising structural units derived from acrylamide and/or methacrylamide monomers, and anionic and cationic groups attached to the copolymer backbone. In the context of the present application the term "amphoteric polymer" means a polymer, where both cationic and anionic groups are present at pH 7. Thus the constituent a) is a copolymer, which has a backbone, to which both the cationic and anionic groups are attached. According to one embodiment, the polymer composition may also comprise two or more constituents a), i.e. a plurality of constituents a), which are amphoteric copolymers, and which have different chemical and/or physical characteristics. The cationic groups in the constituent a) may be hydrolytically stable or they may be hydrolytically unstable.

According to another embodiment of the invention the polymer composition comprises a constituent b), which contains a first polymer, which is copolymer, which comprises structural units derived from acrylamide and/or methacrylamide monomers, and anionic or cationic groups attached to the backbone of the first polymer, as well as a second polymer, which comprises groups with opposite charge than the first polymer. Thus, the constituent b) may comprise two or more different first polymers and/or two or more different second polymers. In other words, the constituent b) may contain two or more different first polymers and one second polymer, or one first polymer and two or more different second polymers, or two or more different first polymers and two or more different second polymers. The different first or second polymers may have different chemical and/or physical characteristics. The cationic groups in constituent b) may be hydrolytically stable or they may be hydrolytically unstable. The second polymer may also be a copolymer, which comprises structural units derived from acrylamide and/or methacrylamide monomers. If the second polymer is a copolymer, its backbone may be same or different than the backbone of the copolymer, which is the first polymer.

The first polymer of constituent b) may be a dispersion polymer, which is obtained by polymerising cationic polyacrylamide within an organic coagulant matrix. The dispersion polymers suitable for use in the present invention may be synthesised by using a controlled molecular weight cationic polyacrylamide polymerised within a coagulant matrix. The coagulant matrix has higher cationic charge than the polyacrylamide which is polymerised within it. The coagulant matrix may comprise [3-(methacryloylamino)propyl] trimethylammonium chloride (MAPTAC), polydiallyldimethylammonium chloride (poly-DADMAC), polyamine, polyvinylamine, dimethylaminoethylacrylate methyl chloride or any of their mixtures. These dispersion polymers are highly structured polymers demonstrating very little linearity. This is largely due to the inclusion of hydrophobic associative groups in the synthesis. The end result is a dispersion polymer system of high cationic charge density polymers having a low molecular weight and medium cationic charge density polymers having high molecular weight. These dispersion polymers are free of volatile organic compounds (VOC's) or alkyphenol ethoxylate. The molecular weight of the dispersion polymer may be 5 000 000-7 700 000 g/mol and it may have a charge density value of 3-6 meq/g.

According to one further embodiment of the invention the polymer composition comprises a constituent c), which contains a third polymer, which comprises a copolymer comprising structural units derived from acrylamide and/or methacrylamide monomers, as well as hydrolytically unstable cationic groups attached to the copolymer backbone of the third polymer. The final polymer composition of the papermaking agent system originates from constituent c) having hydrolytically unstable cationic groups. A part or all of the hydrolytically unstable cationic groups of the constituent c) may be converted into anionic groups at the conditions prevailing at starch cooking, thus providing an amphoteric polymer, which is present in the final papermaking agent system. The obtained amphoteric polymer composition has both cationic and anionic groups at pH 7. The third polymer of constituent c) may comprise one or more different cationic groups, of which at least one is or at least some are hydrolytically unstable. According to one preferable embodiment the third polymer of constituent c) comprises both hydrolytically unstable cationic groups and hydrolytically stable cationic groups. The constituent c) may be a single third polymer or a mixture of a plurality of third polymers. This means that constituent c) may be a single third polymer, which is a copolymer comprising both hydrolytically stable and unstable cationic groups attached to its structure or backbone, or the constituent c) may be a mixture of at least one first third polymer, which comprises hydrolytically unstable cationic groups attached to its structure or backbone, and of at least one second third polymer, which comprises hydrolytically stable cationic groups attached to its structure or backbone. In case the constituent c) comprises two or more third polymers, at least one of them, preferably all of them, may be copolymer(s) comprising structural units derived from acrylamide and/or methacrylamide monomers, According to one embodiment of the invention the hydrolytically unstable cationic groups in constituents a), b) and/or c) may originate from monomers selected from the group consisting of 2-(dimethylamino)ethyl acrylate (ADAM), [2-(acryloyloxy)ethyl] trimethylammonium chloride (ADAM-CI), 2-dimethylaminoethyl methacrylate (MADAM) and [2-(methacryloyloxy)ethyl] trimethylammonium chloride (MADAM-CI). In the context of the present application the term "hydrolytically unstable" means that the cationic group is hydrolysed into anionic group in the presence of water at the conditions prevailing during starch cooking, i.e. at temperature 95-150° C. These listed monomers may be copolymerised together with acrylamide and/or methacrylamide monomers in order to obtain copolymers with hydrolytically unstable cationic groups that are suitable for use in the papermaking agent system.

According to another embodiment of the invention the hydrolytically stable cationic groups in constituents a), b) and/or c) may originate from monomers selected from the group consisting of [3-(acryloylamino)propyl] trimethylammonium chloride (APTAC), [3-(methacryloylamino)propyl] trimethylammonium chloride (MAPTAC), diallyldimethylammonium chloride (DADMAC) and n-vinylformamide. For example, non-ionic n-vinylformamide is hydrolysed during polymerisation in order to give a hydrolytically stable cationic group, attached to the copolymer backbone. In the context of the present application the term "hydrolytically stable" means that the cationic group resists chemical decomposition, i.e. hydrolysis, in the presence of water at the conditions prevailing during starch cooking, i.e. at temperature 95-150° C. These listed monomers may be copolymerised together with acrylamide and/or methacrylamide monomers in order to obtain copolymers with hydrolytically stable cationic groups that are suitable for use in the papermaking agent system.

The anionic groups in constituents a) and b) may be derived from monomers, which are selected from the group consisting of acrylic acid, (meth)acrylic acid, maleic acid, crotonic acid, itaconic acid, vinylsulphonic acid, 2-acrylamide-2-methylpropanesulfonic acid, styrene sulfonic acid, vinyl phosphonic acid and ethylene glycol methacrylate phosphate. These listed monomers may be copolymerised together with acrylamide and/or methacrylamide monomers, optionally also together with the above listed monomers for hydrolytically stable/unstable cationic groups in order to obtain copolymers suitable for use in the papermaking agent system as constituent b) or as constituent a).

In case the polymer composition is obtained by using constituent c), the anionic groups in the polymer composition are derived, at least partly, preferably mainly, more preferably completely, from hydrolytically unstable cationic groups, which have been converted into anionic groups at the conditions prevailing at the cooking of the starch mixture.

According to one embodiment of the invention the polymer composition has a net charge of 0.1-5.5 meq/g, preferably 0.5-5.5 meq/g, more preferably 1-1.5 meq/g, at pH 7. Thus, even if the polymer composition comprises negative groups, the net charge of the polymer composition remains positive, which improves the interaction of the formed starch/polymer complex to the fibres in the furnish. The net charge of an individual constituent a), b) or c) is calculated as the sum of the charges of the constituent's cationic groups and anionic groups. According to one preferred embodiment, the anionic groups in constituents a) and/or b) have a net charge of at least −0.2 meq/g, preferably in the range from −0.3 to −3.0 meq/g, more preferably from −0.4 to −1.5 meq/g, at pH 7.

According to one embodiment of the invention, the charge ratio of the cationic groups to the anionic groups in the constituent a) and/or in the constituent b) of the polymer composition is between 1.1:1 and 20:1, preferably between 1.3:1 and 10:1, more preferably between 1.5:1 and 3:1. The charge ratio may be influenced or controlled by selecting the number of anionic and cationic groups in constituents a) and b). The charge ratio of the polymer composition, which originates from constituent c) may be selected or controlled by selecting the number of hydrolytically unstable and stable cationic groups in constituent c). Suitable charge ratio in the polymer improves the reaction between cationic starch, polymer composition and the fibres in the furnish.

According to one embodiment of the invention the polymer composition comprises 10-95 weight-%, preferably 15-90 weight-%, more preferably 20-80 weight-%, still more preferably 25-75 weight-%, of structural units derived from acrylamide and/or methacrylamide monomers, calculated from the total dry weight of the polymer composition. Preferably the polymer composition comprises a copolymer of acrylamide with one or more anionic monomers and/or cationic stable or unstable monomers listed above. Also glyoxylated acrylamide copolymers are suitable for use in the present invention. The acrylamide copolymer can be either in acid or in salt form, and it can be linear, branched or crosslinked.

The polymer composition enhances and increases the cationicity of the starch in the papermaking agent system. Typically the increase is 0.01-0.2 meq/g, preferably 0.015-0.1 meq/g, calculated for dry starch.

According to one embodiment of the invention the constituents a) and/or b) may be added before the cooking of the starch mixture when the cationic groups of the constituent(s) are hydrolytically stable. The hydrolytically stable cationic groups are not decomposed, i.e. hydrolysed, during the cooking but retain substantially their chemical structure or nature. The constituents a) and b), which comprise hydrolytically stable cationic groups, may alternatively be added to the starch solution after the cooking of the starch mixture.

According to another embodiment of the invention the constituents a) and/or b) may be added to the cationic starch solution after the cooking of the starch mixture when the cationic groups of the constituents a) and/or b) are hydrolytically unstable. When the constituents a) or b), which comprise hydrolytically unstable cationic groups, are added to the cationic starch solution after the cooking of the starch mixture, the risk for decomposition or undesired reactions of the unstable cationic groups is minimised or even completely eliminated.

According to a further embodiment of the invention the constituent c) is added before the cooking of the starch mixture and a part of the cationic groups of constituent c) are hydrolysed into anionic groups during the cooking. When at least a part of the cationic groups of constituent c) is converted to anionic groups through hydrolysis during cooking, a polymer composition comprising both cationic and anionic groups is obtained. Thus the polymer composition, which comprises both anionic and cationic groups, is made "in situ" during the cooking of starch mixture, and a papermaking agent system comprising cationic starch and an amphoteric polymer composition is obtained.

The constituents a), b) and c) may be added in dry form, i.e. as a powder, or in liquid form, i.e. as a solution. If the constituent a), b) and/or c) is added before the cooking of the starch mixture, it may be added either to the starch mixture or to one of the components forming the starch mixture, preferably to the water component before it is mixed with the starch component.

The papermaking agent system may comprise polymer composition in amount of 0.1-50 weight-%, preferably 0.1-30 weight-%, more preferably 0.2-15 weight-%, calculated from total amount of starch.

An object of the present invention is also a method for making a papermaking agent system in liquid form, which comprises
(i) preparing a cationic starch solution by cooking a starch mixture, which comprises a starch component and a water component, and
(ii) obtaining a polymer composition, which has anionic and cationic groups and which has net charge of >0.1 meq/g, preferably >0.5 meq/g, at pH 7, the polymer composition comprising or originating from at least one of constituents a), b) or c), where
  constituent a) is an amphoteric polymer, which is a copolymer comprising structural units derived from acrylamide and/or methacrylamide monomers, and anionic and cationic groups attached to the copolymer,
  constituent b) contains a first polymer, which is a copolymer comprising structural units derived from acrylamide and/or methacrylamide monomers, and anionic or cationic groups attached to the copolymer, as well as a second polymer, which comprises groups with opposite charge than the first polymer, or
  constituent c) contains a third polymer, which comprises a copolymer comprising structural units derived from acrylamide and/or methacrylamide monomers, as well as hydrolytically unstable cationic groups attached to the copolymer,
wherein constituent a), b) or c) is added to one of the components of the starch mixture or to the starch mixture before the cooking of the starch mixture, and/or constituent a) or b) is added to the cationic starch solution after cooking of the starch mixture.

According to one embodiment of the invention, the papermaking agent system is added to the furnish before formation of the paper web or board web, preferably to the thick stock. Thick stock is here understood as a fibrous stock or furnish, which has consistency of at least 20 g/l, preferably more than 25 g/l, more preferably more than 30 g/l. According to one embodiment, the addition of the papermaking agent system is located after the stock storage towers, but before thick stock is diluted in the wire pit (off-machine silo) with short loop white water.

According to another embodiment of the present invention it is possible to add the papermaking agent system to the short circulation.

According to one embodiment of the invention the papermaking agent system is especially suitable for use with furnishes with high filler content. It is especially suited for mechanical pulp or for furnishes comprising recycled fibres. According to one preferred embodiment, the furnish may contain at least 30% of mechanical pulp or recycled fibre, typically at least 50% of mechanical pulp or recycled fibre, calculated on basis of dry fibre raw material.

According to one embodiment of the invention the papermaking agent system is advantageous for furnish, which has a cationic demand of >100 µeq/l, preferably >200 µeq/l, measured before dosing of the papermaking agent system.

The ash content of paper or board product before coating, if any, is >10%, preferably >15%, more preferably >20%, even more preferably >25%. The present invention is suitable for improving strength of the paper web when producing paper grades including super calendered (SC) paper, ultralight weight coated (ULWC) paper, light weight coated (LWC) paper and newsprint paper, but not limited to these. Typical coated magazine paper, such as LWC, comprises mechanical pulp around 40-60 weight-%, bleached softwood pulp around 25-40 weight-% and fillers and/or coating agents around 20-35 weight-%. SC paper comprises mechanical pulp around 70-90 weight-% and long fibered cellulose pulp around 10-30%. The paper web may comprise fibres from hardwood trees or softwood trees or a combination of both fibres. The fibres may be obtained by any suitable pulping or refining technique normally employed in paper making, such as thermomechanical pulping (TMP), chemimechanical (CMP), chemithermo-mechanical pulping (CTMP), groundwood pulping, alkaline sulphate (kraft) pulping, acid sulphite pulping, and semichemical pulping. The paper web may comprise only virgin fibres or recycled fibres or a combination of both. The weight of the final paper web may be 30-800 g/m$^2$, typically 30-600 g/m$^2$, more typically 50-500 g/m$^2$, preferably 60-300 g/m$^2$, more preferably 60-120 g/m$^2$, even more preferably 70-100 g/m$^2$.

The present invention is also suitable for improving strength of the board web when producing paperboard like liner, fluting, folding boxboard (FBB), white lined chipboard (WLC), solid bleached sulphate (SBS) board, solid unbleached sulphate (SUS) board or liquid packaging board (LPB), but not limited to these. Boards may have grammage from 120 to 500 g/m$^2$ and they may be based 100% on primary fibres, 100% on recycled fibres, or to any possible blend between primary and recycled fibres.

According to one embodiment of the invention the papermaking agent system is used for producing paper or board, which is based on recycled fibres or mechanical pulp. The pulp to be treated comprises, for example 50 weight-%, preferably 70 weight-%, more preferably 80 weight-%, of recycled fibres and/or fibres from mechanical pulping process.

In one embodiment the amount of polymer composition is 0.1-1.5 kg/ton produced paper. The amount of cationic starch may be 5-15 kg/ton produced paper.

According to one embodiment the papermaking agent in liquid form, comprises
(i) cationic starch solution, prepared by cooking a starch mixture comprising a starch component and a water component, and
(ii) polymer composition, which has anionic and cationic groups, the polymer composition comprising or originating from at least one of constituents a), b) or c), which has net charge of >0.1 meq/g, preferably >0.5 meq/g, at pH 7, where the constituent
   a) is an amphoteric polymer, which comprises a copolymer comprising structural units derived from acrylamide and/or methacrylamide monomers, and anionic and cationic groups attached to the copolymer,
   b) contains a first polymer, which comprises a first copolymer comprising structural units derived from acrylamide and/or methacrylamide monomers, and anionic or cationic groups attached to the first polymer, as well as
      a second polymer, which comprises groups with opposite charge than the first polymer, or
   c) contains a first polymer, which comprises a first copolymer comprising structural units derived from acrylamide and/or methacrylamide monomers, as well as hydrolytically unstable cationic groups,
wherein constituent a), b) or c) is added to one of the components of the starch mixture or to the starch mixture before the cooking of the starch mixture, and/or
   constituent a) or b) is added to the cationic starch solution after cooking of the starch mixture.

The invention is described in more detail below with reference to the enclosed schematic drawing, in which
FIG. 1 shows schematically the manufacture of the papermaking agent system according to the present invention.

FIG. 1 shows schematically the manufacture of the papermaking agent system according to the present invention. Starch component is fed from a storage vessel 101 to a mixing tank 102 where it is mixed with water component and a starch mixture is obtained. Starch mixture is transferred to a cooking stage 103 whereby a starch solution is obtained and transferred to a storage tank 104.

In FIG. 1 possible feeding points for the various constituents a), b) and c) of the polymer composition are marked with letters A, B and C, respectively.

Constituent a) comprising an amphoteric copolymer with both anionic and cationic groups can be added before cooking stage 103 or after cooking stage 103 if at least part of the cationic groups are hydrolytically stable. In case all the cationic groups of the amphoteric copolymer are hydrolytically unstable the constituent a) is added after the cooking stage 103.

Constituent b) comprising a first polymer, which is a copolymer having cationic or anionic groups attached to the copolymer, and a second polymer having groups of opposite charge attached to it. The first and second polymer may be added simultaneously or sequentially after each other. If at least part of the cationic groups in constituent b) are hydrolytically stable, both the first polymer and the second polymer may be added before the cooking stage 103. In case all the cationic groups in constituent b) are hydrolytically unstable both the first and the second polymer may be added after the cooking stage 103, or alternatively, the polymer comprising the anionic groups may be added before the cooking stage 103 and the polymer comprising the cationic groups may be added after the cooking stage 103.

Constituent c) comprising a third polymer, which is a copolymer with hydrolytically unstable cationic groups is added before the cooking stage 103. During the cooking the hydrolytically unstable cationic groups are converted to anionic groups. The constituent c) comprises preferably also hydrolytically stable cationic groups, which may be attached to the same copolymer backbone as the hydrolytically unstable cationic groups. The constituent c) may also comprise a second third polymer, which comprises the hydrolytically stable groups.

The constituents, which are added to starch mixture before the cooking stage 103 may be added either to the starch mixture, after the mixing of the starch component and the water component, or to one of the components of the mixture, before they are mixed together. In the latter case, the addition is done preferably to the water component.

EXPERIMENTAL

Some embodiments of the invention are described in the following non-limiting examples.

Example 1

Papermaking Agent Systems

In all tests, starch is cationic corn starch, having DS 0.043 and moisture content of 12.2%. Ash content of the dry starch material is 2.77%. 10% starch slurry has pH value of 6. Starch is cooked at 1% concentration at 97-100° C. at atmospheric pressure for 90 min and then cooled to 25° C.

In order to obtain a papermaking agent system comprising cationic starch solution and a polymer composition following polymer constituents are added into starch mixture prior cooking:

Alternative 1: Aqueous cationic dispersion polymer of cationic polyacrylamide, CPAM, and poly-DADMAC. Proportion of CPAM is 17.5 weight-% of the dispersion. CPAM comprises 70 mol-% of acrylamide, 26 mol-% of DADMAC and 4 mol-% of cationic acrylate ester monomer. MW of CPAM is about 5 000 000 g/mol and charge density is 3.0 meq/g. Proportion of poly-DADMAC is 17.5 weight-% of the dispersion. Charge density of the poly-DADMAC is 6.2 meq/g and the average molecular weight about 300 000 g/mol. Total polymer content is 35 weight-%. Dry solids content is 38 weight-%. Measured charge density is 4.52 meq/g dry material, at pH 2.9.

Alternative 2: Amphoteric polymer, which is an aqueous solution of co-polymer of acrylamide, APTAC and acrylic acid. Cationicity of amphoteric polymer is 10 mol-% and anionicity 5 mol-% of total monomers. Viscosity of the polymer is 13 700 mPas at 19.4% concentration at pH 4.0. Charge density is 1.2 meq/g dry product, at pH 3, and 0.6 meq/g dry product, at pH 7.

Alternative 3: Cationic non-hydrolysable polymer for enhancing the efficiency of starch is an aqueous solution of non-thermosetting polyamidoamine-epichlorohydrin co-polymer. Viscosity of the polymer is 45 mPas at 25% concentration, charge density is 4.2 meq/g dry product, at pH 4.

Retention polymer is commercial cationic polyacrylamide Fennopol K 3400 R (Kemira Oyj). The product is dry powder, which is dissolved at 0.5% concentration by mixing the powder with water and agitating the solution for 1 h at 25° C.

Characterisation of Furnish and Process Water pH, conductivity, turbidity, charge and chemical oxygen demand of furnish and process water samples are characterised by using measurements and devices defined in Table 1.

TABLE 1

Measurements and devices used for characterisation of the furnish and process water.

| Measurement | Device |
|---|---|
| pH | Knick Portamess, Van London-pHoenix company, Texas, USA |
| Conductivity | Knick Portamess Knick Portamess, Van London-pHoenix company, Texas, USA |
| Turbidity | WTW Turb 555 IR, WTW Wissenschaftlich-Technische Werkstätten GmbH, Weilheim, Germany |
| Charge | Mütek PCD 03, BTG Instruments GmbH, Herrsching, Germany |
| Chemical Oxygen Demand (COD) | DR Lange Lasa 100, Hach Lange GmbH, Düsseldorf, Germany |

Zeta potential for furnish and process water samples is measured as follows: Pulp samples for zeta potential measurements are diluted to approximately 1% consistency with clear filtrate of paper machine process water. Zeta potential is determined using Mütek SZP-06 System Zeta Potential device (BTG Instruments GmbH, Herrsching, Germany). This device applies a vacuum to draw pulp stock against a screen and forms a pad of fines and fibres between two electrodes. A pulsating vacuum causes the aqueous phase to oscillate through the plug, thus shearing off the counterions and generating a streaming potential. The zeta potential is calculated by using the measured streaming potential, conductivity, and the pressure difference. The chemical treatment time, before each measurement, was obtained in 5 min.

The fines content of the furnish is measured by employing Dynamic Drainage Jar, DDJ (Paper Research Materials, Inc., Seattle, Wash.), with 60M wire screen, which has 210 µm diameter screen holes. Consistency of the furnish is approximately 1 and the furnish slurry volume is 500 ml in DDJ experiment. Stirring speed is 1000 rpm and stirring is started 45 s before drainage. 100 g of the screened material is filtrated and weighed after drying.

Characteristics of SC-paper furnish employed in the study are given in table 2. SC-paper furnish comprises approximately 75% of ground wood pulp and approximately 25% of long fibre kraft pulp.

TABLE 2

Characteristics of SC-paper furnish employed in the Examples.

| SC-paper furnish | Mixing chest furnish | Clear filtrate | White water |
|---|---|---|---|
| pH | 7.1 | 7.6 | 7.8 |
| Turbidity (NTU) | 95 | 21 | 23 |
| Conductivity filtrate (µS/cm) | 2270 | 1700 | 2000 |
| Charge (µeq/l) | −43.9 | −50 | −41.1 |
| Zeta potential (mV) | −18.7 | — | — |
| Consistency (g/l) | 33.8 | — | — |
| Ash content (%) | 18.3 | — | — |
| COD (mg/l) | 1512 | 1199 | 1252 |
| Fines content (%) (60M wire) | 49 | — | — |

Manufacture of Sheets and their Testing

Figure 2:
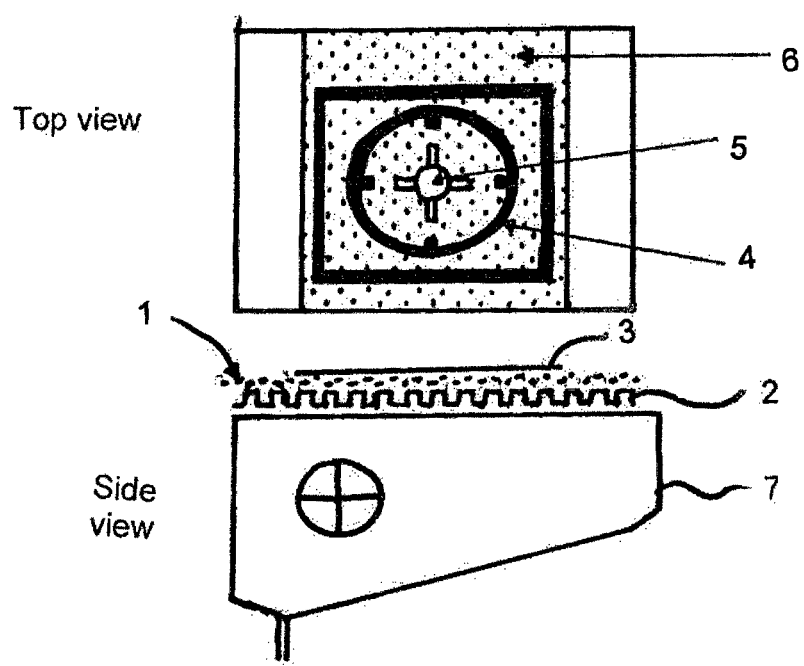

SC-paper sheets are formed with Moving Belt Former (MBF), shown in FIG. 2. MBF is PC-controlled sheet former which utilises a real paper machine wire. Drainage occurs due to pulsating suction. The wire 1 itself is immobile and a moving perforated belt 2 is arranged under the wire 1, which generates suction effect similar to those occurring at the wire section of a paper machine. MBF forms a single sheet 3 instead of continuous paper web. The furnish suspension is added to a mixing vessel 4 with mixer 5 and mixed with fillers and retention chemicals. Drainage begins when the drainage foil 6 moves away and furnish suspension comes into contact with the wire 1. Moving belt 2 wipes water away from the wire 1 and the vacuum box 7 generates suction that pulsates to the wire 1 when the holes of the moving belt 2 passes the wire.

The wire type employed the study is DL2874 two-layer wire with 5100 $m^3/(m^2h)$ air permeability. The vacuum is 29 kPa, the stirring speed 2000 rpm, and stirring time 40 s The mixing chest furnish is diluted to consistency of 4.6 g/l % with clear paper machine filtrate. Cationic starch and polymer composition are added to the diluted furnish 3 min before 290 ml of the diluted furnish and 290 ml white water are added to the mixing vessel of the MBF, where the furnish mixture is kept under constant mixing. Filler, which comprises clay and ground calcium carbonate in a ratio of 50:50, is added 20 s before the drainage. The consistency is 6.4 g/l after the filler addition. The retention polymer is added 10 s before drainage. Mixing is stopped approximately 5 s before the drainage. After the sheet formation, the sheets are dried 2 min with a hot plate dryer (Lorentzen & Wettre). After the drying, sheets are pre-conditioned for 24 h at 23° C. in 50% relative humidity.

SC-paper paper sheets are calendered once on both sides before paper testing with a nip pressure of 150 kN/m and a temperature of 80° C.

The properties of the paper sheets are measured using the methods and devices disclosed in Table 3. Initial wet web strength is determined from undried fine paper sheets with an ash content of approximately 25%. The sheets are pressed 5 min at 4.5 bar pressure, and the wet tensile strength is measured immediately after pressing.

TABLE 3

Methods and devices used for measuring paper sheet properties.

| Measurement | Standard, Device |
|---|---|
| Grammage | ISO 536, Mettler Toledo |
| Ash content | ISO 1762, Precisa PrepAsh 229 |
| Tensile strength | ISO 1924-3, Lorentzen & Wettre Tensile tester |
| Scott bond | T 569, Huygen Internal Bond tester |

Results

A line is adjusted to the obtained results. From the line it is possible read comparable tensile strength values and retention polymer consumption at standard retention level of 78.2% and at standard grammage of 80.8 $g/m^2$. Ash content of the produced sheets is 36±1%. Dosage starch, polymer composition and retention polymer is given in relation to the produced paper. 0-test is performed without any addition of starch or polymer composition.

The results for the paper sheets comprising different amounts of starch and various polymer compositions are given in Table 4.

TABLE 4

Results for Example 1.

| System | Tensile index, Nm/g | Tensile energy absorption index, J/kg | Scott Bond, J/m² | Retention polymer consumption, g/t |
|---|---|---|---|---|
| 0-test | 10.3 | 85 | 131 | 280 |
| Cationic starch, 6.4 kg/t | 10.3 | 94 | 132 | 223 |
| Alternative 1, 29 g/t + cationic starch, 6.4 kg/t | 10.8 | 101 | 140 | 181 |
| Alternative 1, 58 g/t + cationic starch, 6.4 kg/t | 10.9 | 104 | 138 | 190 |
| Alternative 2, 256 g/t + cationic starch, 6.4 kg/t | 11.4 | 111 | 133 | 153 |
| Alternative 2, 1.6 kg/t + cationic starch, 6.4 kg/t | 10.9 | 106 | 137 | 154 |
| Alternative 3, 320 g/t + cationic starch, 6.4 kg/t | 10.8 | 102 | 133 | 170 |
| Alternative 3, 1.6 kg/t + cationic starch, 6.4 kg/t | 10.3 | 85 | 139 | 191 |

Example 2

Hydrolytic Stability of Amphoteric Polyacrylamides

Hydrolytic stability of amphoteric polyacrylamides at 100° C. is tested. Amphoteric polyacrylamides, which contain different cationic monomer in the polymer, are used in the stability test. The following polymers are used.

Polymer 1: Aqueous solution of co-polymer of 85 mol-% acrylamide, 10 mol-% acryloyloxyethyltrimethylammonium chloride (ADAM-Cl) and 5 mol-% acrylic acid.

Polymer 2: Aqueous solution of co-polymer of 85 mol-% acrylamide, 10 mol-% [3-(acryloylamino)propyl] trimethylammonium chloride (APTAC) and 5 mol-% acrylic acid.

Polymer 3: Aqueous solution of co-polymer of 85 mol-% acrylamide, 10 mol-% diallyldimethylammonium chloride (DADMAC) and 5 mol-% acrylic acid.

Measured values of the polymer solutions are given in Table 5.

TABLE 5

Properties of the polymer solutions used in Example 2.

| Polymer # | Cat. Monomer | Dry solids (%) | Viscosity (mPas) | pH | Charge, pH 3 (meq/g dry) | Charge, pH 7 (meq/g dry) |
|---|---|---|---|---|---|---|
| 1 | ADAM-Cl | 19.8 | 10 500 | 3.9 | 1.20 | 0.55 |
| 2 | APTAC | 19.4 | 13 700 | 4.0 | 1.21 | 0.60 |
| 3 | DADMAC | 20.0 | 5 200 | 3.8 | 1.24 | 0.60 |

The polymers are first diluted with 100 mmol/l potassium phosphate buffer, pH 7.4, and then further with water in a manner that concentration of the polymer solutions is 1.00% and concentration of potassium phosphate is 50 mmol/l. pH of each solution is measured at 25° C. Solutions are kept in sealed autoclave bottles for 24 hours at 100° C. The bottles are then cooled and pH measured at 25° C. Charge densities of the polymers are determined by Mütek PDC 03 pH— particle charge detector (BTG Instruments GmbH, Herrsching, Germany) equipped with Mütek PCD Titrator Three-titrator unit (BTG Instruments GmbH, Herrsching, Germany), using 0.001 M PES-Na as titrant polymer for net cationic polymers and 0.001 N poly-DADMAC as titrant polymer for net anionic polymers, both titrant polymers supplied by BTG Instruments GmbH, Herrsching, Germany. Charge densities are determined at pH 3. The results are given in Table 6.

TABLE 6

Results of hydrolytic stability experiments of amphoteric polyacrylamides.

| Polymer # | Cat. Monomer | pH before 24 h at 100° C. | pH after 24 h at 100° C. | Charge, pH 3 (meq/g dry) |
|---|---|---|---|---|
| 1 | ADAM-Cl | 7.4 | 7.2 | −0.15 |
| 2 | APTAC | 7.3 | 7.3 | 1.20 |
| 3 | DADMAC | 7.3 | 7.3 | 1.22 |

The results show that amphoteric polyacrylamide, which contains ADAM-Cl as cationic monomer loses completely its cationic charge in conditions comparable to conditions prevailing during starch cooking. Amphoteric polyacrylamides, which contain APTAC or DADMAC as cationic monomer, do not show any significant change in their cationic charge.

Example 3

Hydrolytic Stability of Cationic Dispersion Polymer

Hydrolytic stability of cationic dispersion polymer is tested at 100° C. The dispersion polymer is the following:

Cationic dispersion polymer corresponds to Alternative 1 in Example 1.

The dispersion polymer is diluted first with 100 mmol/l potassium phosphate buffer, pH 7.4, and then further with water in a manner that concentration of the polymer solution is 1.00% and concentration of potassium phosphate is 50 mmol/l. A clear transparent solution is obtained. pH of the solution is measured at 25° C., pH 7.3. Solution is kept in a sealed autoclave bottle for 24 hours at 100° C. Gel lump is formed in to the bottom of the autoclave bottle during the storage time at 100° C. The bottle is then cooled and pH is measured at 25° C. pH is 7.2. pH of the mixture is adjusted to 2.9 with hydrochloric acid and the mixture is mixed for 10 min with magnetic stirrer. The lump is dissolved during the stirring period. Charge density of the polymer is determined by Mütek PDC 03 pH—particle charge detector (BTG Instruments GmbH, Herrsching, Germany), equipped with Mütek PCD Titrator Three-titrator unit (BTG Instruments GmbH, Herrsching, Germany), using 0.001 M PES-Na as titrant polymer for net cationic polymer, titrant polymer supplied by BTG Instruments GmbH, Herrsching, Germany. Charge density is 4.33 meq/g dry material at pH 2.9.

Charge density of the dispersion polymer decreases by 0.19 meq/g during heating. The decrease shows that a part of the cationic groups of the dispersion polymer are hydrolysed during the heating, whereby the cationic dispersion polymer is changed into an amphoteric dispersion polymer. The formation of amphoteric polymer can be observed by the formation of gel lump and then by dissolution of the lump at pH 2.9. The reason for the lump formation is the formation of poly-ion complex of cationic poly-DADMAC groups and anionic groups of hydrolysed polyacrylamide. The dissolution of the lump is a result of breakage of the poly-ion complex, when the formed carboxylic acid anions turn non-ionic at pH 2.9. Amphotericity can be as low as about 4 mol-% of cationic charges.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. Papermaking agent system in liquid form, which comprises
   (i) cationic starch solution, prepared by cooking a starch mixture comprising a starch component and a water component, and
   (ii) polymer composition, which has anionic and cationic groups and which has a cationic net charge of >0.1 meq/g, at pH 7, the polymer composition comprising, or originating from constituent c), where
      constituent c) contains a third polymer, which comprises a copolymer comprising structural units derived from acrylamide and/or methacrylamide monomers, as well as hydrolytically unstable cationic groups attached to the copolymer, wherein the hydrolytically unstable cationic groups originate from monomers selected from the group consisting of 2-(dimethylamino)ethyl acrylate, [2-(acryloyloxy)ethyl] trimethylammonium chloride, 2-dimethylaminoethyl methacrylate and [2-(methacryloyloxy)ethyl] trimethylammonium chloride;
   wherein constituent c) is added to one of the components of the starch mixture or to the starch mixture before the cooking of the starch mixture and a part of the hydrolytically unstable cationic groups are hydrolysed into anionic groups during the cooking; and
   wherein the amount of hydrolysed groups is at least 4 mol-% of the total cationic groups in polymer.

2. Papermaking agent system according to claim 1, characterised in that the third polymer of constituent c) is a dispersion polymer, which is obtained by polymerising cationic polyacrylamide within an organic coagulant matrix.

3. Papermaking agent system according to claim 1, characterised in that the third polymer of constituent c) comprises both hydrolytically unstable cationic groups and hydrolytically stable cationic groups.

4. Papermaking agent system according to claim 3, characterised in that the constituent c) is a mixture of
   at least one first third polymer, which comprises hydrolytically unstable cationic groups, and
   at least one second third polymer, which comprises hydrolytically stable cationic groups.

5. Papermaking agent system according to claim 1, characterised in that the polymer composition has a net charge of 0.5-5.5 meq/g, preferably 1-1.5 meq/g, at pH 7.

6. Papermaking agent system according to claim 1, characterised in that it comprises polymer composition in amount of 0.1-50 weight-%, preferably 0.1-30 weight-%, more preferably 0.2-15 weight-%, calculated from total amount of starch.

7. Papermaking agent system according to claim 1, characterised in that the polymer composition comprises 10-95 weight-%, preferably 15-90 weight-%, more preferably 20-80 weight-%, still more preferably 25-75 weight-%, of structural units derived from acrylamide and/or methacrylamide monomers, calculated from the total dry weight of the polymer composition.

8. Papermaking agent system according to claim 1, characterised in that the starch component in the starch mixture has
   an amylopectin content in the range of 65-90%, preferably 70-85%, and
   an amylose content in the range of 10-35%, preferably 15-30%.

9. Papermaking agent system according to claim 1, characterised in that at least 70 weight-% of the starch units of the starch component in the starch mixture has an average molecular weight (MW) over 20 000 000 g/mol, preferably 50 000 000 g/mol, 100 000 000 g/mol.

10. Papermaking agent system according to claim 1, characterised in that starch component in the starch mixture has a degree of substitution (DS) in the range of 0.01-0.20, preferably 0.01-0.1, more preferably 0.015-0.06.

11. Papermaking agent system according to claim 1, characterised in that starch component has a charge density of 0.06-1.0 meq/g.

12. Method for making a papermaking agent system in liquid form, which comprises
   (i) preparing a cationic starch solution by cooking a starch mixture, which comprises a starch component and a water component, and
   (ii) obtaining a polymer composition, which has anionic and cationic groups and which has net charge of >0.1 meq/g, the polymer composition originating from constituent c), where
      constituent c) contains a third polymer, which comprises a copolymer comprising structural units derived from acrylamide and/or methacrylamide monomers, as well as hydrolytically unstable cationic groups attached to the copolymer, wherein the hydrolytically unstable cationic groups originate from monomers selected from the group consisting of 2-(dimethylamino)ethyl acrylate, [2-(acryloyloxy)ethyl] trimethylammonium chloride, 2-dimethylaminoethyl methacrylate and [2-(methacryloyloxy)ethyl] trimethylammonium chloride;
   wherein constituent c) is added to one of the components of the starch mixture or to the starch mixture before the cooking of the starch mixture and a part of the hydrolytically unstable cationic groups are hydrolysed into anionic groups during the cooking; and
   wherein the amount of hydrolysed groups is at least 4 mol-% of the total cationic groups in polymer.

13. Method according to claim 12, characterised in adding the constituent c) in dry form or in liquid form.

14. Method according to claim 12, characterised in that the papermaking agent system is added to the thick stock having consistency of at least 20 g/l.

15. Papermaking agent system in liquid form, which comprises
   (i) cationic starch solution, prepared by cooking a starch mixture comprising a starch component and a water component, wherein the starch component in the starch mixture has
   an amylopectin content in the range of 65-90%, preferably 70-85%, and
   an amylose content in the range of 10-35%, preferably 15-30%; and
   (ii) polymer composition, which has anionic and cationic groups and which has a cationic net charge of >0.1 meq/g, at pH 7, the polymer composition comprising, or originating from constituent c), where
      constituent c) contains a third polymer, which comprises a copolymer comprising structural units derived from acrylamide and/or methacrylamide monomers, as well as hydrolytically unstable cationic groups attached to the copolymer, wherein the hydrolytically unstable cationic groups originate from monomers selected from the group consisting of 2-(dimethylamino)ethyl acrylate, [2-(acryloyloxy)ethyl] trimethylammonium chloride, 2-dimethylaminoethyl methacrylate and [2-(methacryloyloxy)ethyl] trimethylammonium chloride;
wherein constituent c) is added to one of the components of the starch mixture or to the starch mixture before the cooking of the starch mixture and a part of the hydrolytically unstable cationic groups are hydrolysed into anionic groups during the cooking; and
wherein the amount of hydrolysed groups is at least 4 mol-% of the total cationic groups in polymer.

* * * * *